C. S. JANSEN.
VEHICLE WHEEL ATTACHMENT.
APPLICATION FILED JUNE 11, 1918.
1,358,156.
Patented Nov. 9, 1920.
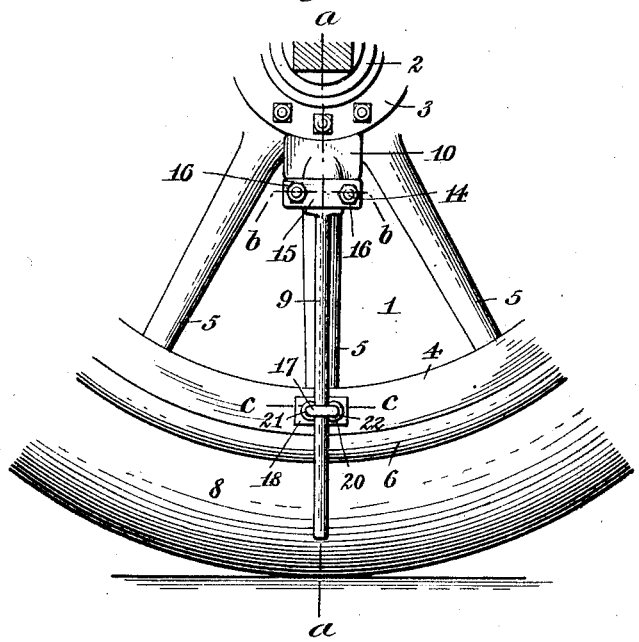
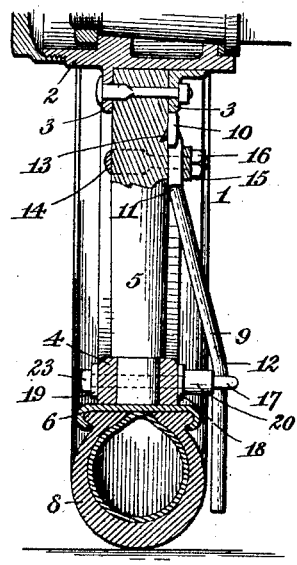
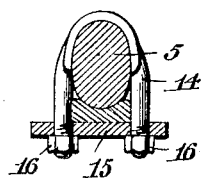
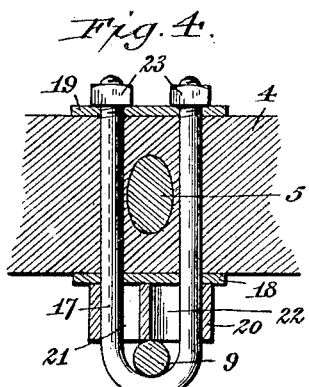
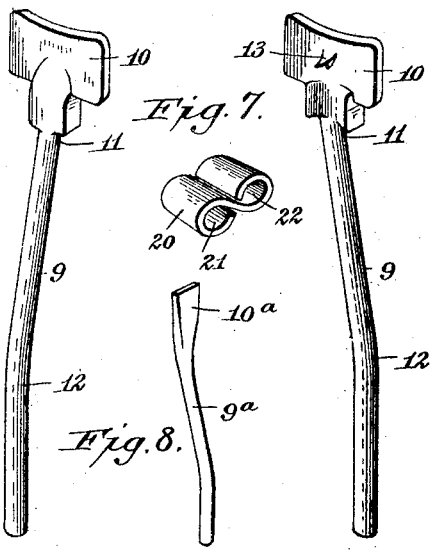
Chester S. Jansen, Inventor.
By Emil Neubart
Attorney.
Witness:
E. M. Schweiger

UNITED STATES PATENT OFFICE.

CHESTER S. JANSEN, OF BUFFALO, NEW YORK.

VEHICLE-WHEEL ATTACHMENT.

1,358,156.
Specification of Letters Patent. Patented Nov. 9, 1920.

Application filed June 11, 1918. Serial No. 239,402.

*To all whom it may concern:*

Be it known that I, CHESTER S. JANSEN, a citizen of the United States, residing at Buffalo, in the county of Erie and State of New York, have invented certain new and useful Improvements in Vehicle-Wheel Attachments, of which the following is a specification.

This invention relates to an automobile attachment, and more particularly to a tire deflation indicating device whereby a signal is given when the pressure of the pneumatic tire of any of the automobile wheels is reduced below a desired point, or when the tire is punctured and the air escapes therefrom.

The primary object of my invention is to provide a device of this kind which can be easily applied to any automobile or other vehicle wheel and which is rigid, durable and simple in construction and readily detached therefrom.

The invention consists in a rigid member applied radially to a vehicle wheel and positioned with its outer end the desired distance from the tread or outer periphery of the tire of the wheel.

It also consists in a rigid radially-disposed member secured to one of the spokes and the felly of a vehicle wheel and having its upper end abutting against a hub member of said wheel and its lower end spaced the desired distance from the road surface when directed vertically and when the tire of the wheel is fully inflated.

It further consists in the novel features of construction and in the arrangement and combination of parts to be hereinafter described and more particularly pointed out in the subjoined claims.

In the drawings:—

Figure 1 is a side elevation of a portion of a vehicle wheel having a pneumatic tire applied thereto, the wheel being viewed from the inner side.

Fig. 2 is a section taken radially through the wheel on line *a—a*, Fig. 1 the striking or signaling member and the lower fastening means for the same being shown in elevation.

Fig. 3 is an enlarged cross section taken on line *b—b*, Fig. 1.

Fig. 4 is an enlarged cross section taken on line *c—c*, Fig. 1.

Figs. 5 and 6 are detached perspective views of the striking or signaling member of the device viewed from different points.

Fig. 7 is a detached perspective view of the spacing member for holding the outer end of the device spaced from the tire.

Fig. 8 is a perspective view of a modified form of striking or signaling member.

Referring now to the drawings in detail like numerals of reference refer to like parts in the several figures.

The reference numeral 1 designates the vehicle wheel comprising a hub 2 having the flanges 3, a felly 4, the spokes 5 and the rim 6 secured to the outer peripheral face of said felly. 7 designates the pneumatic tire secured to the rim in any suitable manner. The vehicle wheel to which my improved device is to be applied may be constructed as shown in the drawings, or be otherwise constructed so long as the same is provided with a pneumatic tire 8 which, when it becomes partly deflated, will bring my improved device into action.

My device is applied to each wheel of a vehicle and it comprises a rigid radially-disposed rod 9 having, in preferred form, a widened and flattened upper end 10, the upper edge of which is preferably concaved to conform to the peripheral edge of one of the hub flanges 3. This rod is preferably bent near its upper end, as at 11, and also a short distance from its lower end, as at 12, to offset the lower end from the upper, the intermediate portion being inclined with respect to said ends. On the inner face of the flattened upper end 10 a prong 13 is formed which is embedded into one of the spokes of the vehicle. The flattened upper end of the rod 9 may be of sufficient width to bear against at least three of the spokes at their inner ends, thus preventing turning of the rod on the wheel under the severest use it may be subjected to.

14 designates a fastening device in the form of a clip arranged to straddle one of the spokes of the wheel and the outer ends of the two bolt members of said clip have a connecting bar 15 placed thereon, against which nuts 16 bear that are threaded onto said outer ends.

The lower end of the rod 9 is secured to the wheel felly 4 by means of a U-bolt 17 which is passed through said wheel felly at opposite sides of the tenon of the spoke in line with the rod and through plates 18, 19, applied to opposite sides of said felly. A spacing member 20 is placed between the inner plate 18 and the rod 9 to hold the lower end of the rod out of contact with the tire, which latter is of greater width than the felly. This spacing member is formed of a strip of metal bent into 8-form to form two eyes 21, 22 through which the two parallel members of the U-bolt are passed. This forms a substantial, simple, and cheap spacing member which cannot be lost in the event of the U-bolt becoming loosened. Nuts 23 are applied to the outer ends of the two parallel members of the U-bolt and secure the latter and adjacent parts of the device in a secure manner. The rod is therefore securely clamped near its outer as well as near its inner end.

When the tire is fully inflated the outer end of the rod will be spaced a slight distance from the road surface and therefore when the vehicle is traveling along the road, the rod will not come in contact with the road surface. When, however, for any reason the tire becomes deflated, the outer end of the rod will strike the road surface and by reason of the inner end of the rod abutting against one of the hub flanges, the shock of the rod will not be imparted to the rim or spokes, which would be injurious to the wheel. The contact of the rod with the road surface causes a pounding noise, which is the signal given the operator of the vehicle that his tires need attention. He is therefore enabled, before the tire is completely deflated, to inflate the tire to proper pressure.

In Fig. 8 I have shown a striking or signaling rod 9ª of modified form. This rod is flattened and slightly widened at its upper end, as at 10ª, the width thereof, however, does not exceed that of the spoke against which it is adapted to bear. In this construction it is not found necessary to concave the upper edge of said flattened portion, as a secure bearing is had against the flange of the hub owing to the width of the flattened upper end being less than that of the rod shown in the preferred construction. This rod is, however, applied to the vehicle wheel in the same manner as the rod shown in Figs. 1 and 2, and it may also have a prong similar to the prong 13 shown in Figs. 2 and 6.

By the use of this invention the operator of the vehicle is informed of the necessity of increasing the air pressure in the tire immediately the pressure lowers sufficiently to cause the tire to become somewhat flattened under weight, thus the tire is saved from weakening strains and the life of the same greatly lengthened; it being well known that when a tire is run in a somewhat flattened condition the canvas thereof becomes weakened and has a tendency to crack, all of which is avoided by keeping the tire properly inflated.

My invention is susceptible to various modifications in construction, also in the manner of attaching the signaling rod, without departing from the scope of my invention or sacrificing any of the advantages thereof.

Having thus described my invention, what I claim is:—

1. A signaling device for a vehicle wheel, comprising a rod immovably applied to the vehicle wheel and having its inner end secured to one of the spokes and its outer end fastened to the wheel felly with its outer extremity spaced a distance from the road surface when directed vertically toward the road and when the tire is inflated to desired pressure.

2. A signaling device for a vehicle wheel, comprising a rod having parallel end portions and an inclined intermediate portion, the end portions being secured respectively to one of the spokes and the wheel felly, the outer extremity of the rod when directed vertically toward the road being spaced a distance from the road surface when the tire is inflated to the desired pressure.

3. A signaling device for a vehicle wheel, comprising a radially-disposed rod having a flattened inner end bearing against a plurality of spokes and having its outer end portion offset with respect to its inner end portion but parallel therewith, and means for securing said end portions to the vehicle wheel, the outer extremity of said rod being spaced a distance from the road surface when the rod is directed vertically toward the road and when the tire is inflated to the desired pressure.

4. The combination with a vehicle wheel having a hub, of a radially-disposed rod immovably secured to said wheel and having its inner end abutting against said hub and its outer extremity spaced a predetermined distance from the road surface when closest to said surface and when the tire is inflated to the desired pressure.

5. The combination with a vehicle wheel having a flanged hub, of a radially-disposed rod secured to said vehicle wheel and having a flattened inner end concaved at its inner edge to conform to the periphery of the flange of said hub, the outer extremity of said rod being positioned to come in contact with the road surface only when the tire becomes deflated to a predetermined point and the concaved inner edge of said flattened inner end being in contact with the periphery of the flange of said hub.

6. The combination with a vehicle wheel, of a rigid radially-disposed rod having its inner end bearing against the hub of said wheel and its outer end spaced a distance from the road surface when said rod is directed vertically toward said surface and when the tire is inflated to the desired extent, a clip to secure the inner end of the rod thereto, and fastening means passed through the felly of said wheel and serving to securely fasten said rod near its outer end.

7. The combination with a vehicle wheel, of a radially-disposed rod having a prong formed thereon and having said prong embedded into one of the spokes of said wheel, means for fastening the inner end of said rod to said spoke, and means for fastening the rod near its outer end to the felly of said wheel, the outer end of said rod being spaced the desired distance from the road surface when closest thereto and when the tire is inflated to desired pressure and being adapted to forcibly strike the road surface when the tire becomes deflated to a predetermined pressure.

8. The combination with a vehicle wheel, of a radially-disposed rigid rod secured near its inner end to one of the spokes of the wheel, a U-bolt passing through the wheel felly and straddling said rod, spacing means between said rod and said wheel felly, and nuts applied to the parallel members of said U-bolt to clamp said rod against said spacing means.

9. The combination with a vehicle wheel, of a radially-disposed rigid rod secured near its inner end to one of the spokes of the wheel, a U-bolt passing through the wheel felly and straddling said rod and a spacing member having two eyes through which the parallel members of said U-bolt are passed, said spacing member being positioned between said rod and said wheel felly, and nuts applied to the ends of said parallel members.

10. The combination with a vehicle wheel, of a radially-disposed rigid rod secured of a its inner end to one of the spokes of the wheel, a U-bolt passing through the wheel felly, plates at opposite sides of said wheel felly through which said U-bolt is also passed, an 8-shaped spacing member fitted onto the parallel members of said U-bolt between one of said plates and said rod, and nuts applied to the outer ends of said parallel members and bearing against the other of said plates.

11. A signaling device for a vehicle wheel, comprising a rod having its inner and outer ends secured to said wheel, said rod being provided with a prong embedded into one of the spokes of said wheel and the outer extremity of said rod being spaced a distance from the road surface when closest to said surface and when the tire is inflated to desired pressure.

12. The combination with a vehicle wheel, of a radially-disposed rigid rod secured of a its inner end to the wheel adjacent its hub, a U-bolt passing though the wheel felly, plates at opposite sides of said felly through which said U-bolt is passed, a spacing member between the bight of said U-bolt and one of said plates, and nuts applied to the outer ends of said U-bolt and bearing against the other of said plates.

In testimony whereof I affix my signature.

CHESTER S. JANSEN.